United States Patent Office 3,220,797
Patented Nov. 30, 1965

3,220,797
PROCESS FOR PRODUCING ANHYDROUS ALUMINA
George R. Lester, Mount Prospect, Ill., assignor to Universal Oil Products Company, Des Plaines, Ill., a corporation of Delaware
No Drawing. Filed Nov. 29, 1961, Ser. No. 155,813
5 Claims. (Cl. 23—143)

The present invention relates to a method for preparing alumina, and is specifically directed toward the manufacture of alumina, and alumina-containing refractory inorganic oxide material for utilization as the carrier for catalytically active metallic components. The alumina prepared in accordance with the method of the present invention is particularly advantageous when utilized as the carrier material for a catalytic composite comprising at least one metallic component selected from the metals of groups VI-A and VIII of the Periodic Table.

In the preparation of catalysts, it is extremely important to attain a very high degree of structural defects therein. Generally, the presence of structural defects is characterized by high surface area and abnormal physical properties not present in the absence of structural defects. The creaction of structural defects within a catalytic composite affects its semi-conductivity, thereby altering its role when used as part of a catalyst system. A high degree of semi-conductivity (electronic conductance) within a catalyst represents a high rate of flow of electronic charge through the bulk of the material to the surface, thus transporting the effects of local electrical excesses to the surface, where the desired catalytic activity may be utilized by the reactants. Increasing the semi-conducting properties of a catalytic composite, by increasing the degree of structural defects in the carrier material, is of particular advantage in a multitude of processes characterized by carbonium ion type reactions. Such processes include, but not by way of limitation, alkylation, isomerization, hydrocracking, catalytic cracking, catalytic reforming, etc. In the majority of instances, these processes utilize a catalytic composite capable of effecting carbonium ion type reactions, which composite comprises metallic components selected from the group consisting of the metals of Groups VI-A and VIII of the Periodic Table, and mixtures thereof.

The object of the present invention is to provide a method of increasing the degree of structural defects within a catalytic composite, whereby the semi-conducting properties thereof are improved. This object is achieved by effecting the preparation of the carrier material, and especially alumina, in a particular manner.

Therefore, in a broad embodiment the present invention relates to a method of preparing alumina which comprises reacting mellitic acid with aluminum hydroxide, drying the resulting reaction product and calcining the dried product to form substantially anhydrous alumina.

In another broad embodiment, the present invention provides a method of preparing alumina which comprises forming an aluminum-containing hydrosol, commingling mellitic acid with said hydrosol, precipitating an alumina-mellitic acid composite therefrom, drying the resulting precipitate and calcining the dried precipitate to form substantially anhydrous alumina.

In a specific embodiment, the present invention involves a method of preparing alumina which comprises reacting mellitic acid with aluminum hydroxide to form a reaction product containing $Al_2O_3 \cdot C_{12}O_9 \cdot 18H_2O$ and having an $Al_2O_3$ to $C_{12}O_9$ mol ratio not substantially greater than 3 to 1, drying said reaction product and calcining the dried product to form substantially anhydrous alumina.

The present invention is particularly advantageous in the preparation of a hydrocarbon conversion catalyst comprising at least one metallic component selected from the metals of Groups VI-A and VIII of the Periodic Table combined with alumina prepared by reacting aluminum hydroxide with mellitic acid to form a reaction product containing $Al_2O_3 \cdot C_{12}O_9 \cdot 18H_2O$, drying said reaction product and calcining the dried product to form substantially anhydrous alumina containing less than about 3 mols of water per mol of alumina.

It is recognized that the prior art discloses methods for increasing the surface irregularities of the carrier material employed in the manufacture of various catalytic composites. Such methods include precipitation of the carrier material (in the hydrous form of the inorganic oxide) at various temperatures, drying and/or calcination techniques effected under conditions creating such irregularities, and the addition of various substances, the character of the latter being determined to a great extent by the precise function to be served by the final catalytic composite. For example, the addition of other inorganic oxides, such as germanium oxide and/or titanium oxide, etc., alkali and/or alkaline-earth metallic components, etc., will improve the semi-conducting properties of the carrier material. Halogen selected from the group of fluorine and chlorine, is often added to increase the degree to which carbonium ion type reactions may be catalyzed. However, these methods either produce a catalyst which is specifically tailored for use in promoting a specific reaction in a particular process and no other, or results in a carrier material containing components which exert a contaminating influence in regard to one or more reactions and/or processes. Through the utilization of the method of the present invention, components exerting a contaminating influence do not become an integral part of the catalytic composite, the active agent having been substantially removed in the calcination step. Furthermore, the semi-conducting property of the carrier material may be more readily controlled, where desired, for the purpose of controlling the degree to which carbonium ion type reactions are effected.

From the foregoing embodiments, it is seen that the method of the present invention comprises reacting aluminum hydroxide with mellitic acid, $C_6(CO_2H)_6$, to form a reaction product containing $Al_2O_3 \cdot C_{12}O_9 \cdot 18H_2O$. The reaction between the aluminum hydroxide and mellitic acid may be effected by first precipitating the aluminum hydroxide from an aluminum-containing hydrosol, such as a solution of aluminum chloride, aluminum sulfate, etc., or by initially commingling the desired quantity of mellitic acid with the aluminum-containing hydrosol, thereafter adding ammonium hydroxide or other alkaline precipitant to form the desired reaction product. The reaction product thus formed is such that the $Al_2O_3$ to $C_{12}O_9$ mol ratio is not substantially greater than about 3 to 1, prior to effecting the high-temperature calcination thereof. By varying the quantity of $C_{12}O_9$ used in making the calcined product, the semi-conducting propensity of the carrier may be adjusted for the purpose of controlling the extent to which carbonium ion type reactions will be effected following the deposition of the catalytically active metallic components therewith. The presence of $C_{12}O_9$ within the final catalytic composite does not reduce the catalytic activity thereof with respect to the reaction or reactions to be promoted thereby. To the contrary, the presence of $C_{12}O_9$ within the final catalytic composite has a tendency to increase the semi-conducting propensities thereof.

Following the formation of the reaction product of mellitic acid and aluminum hydroxide, that is, $$Al_2O_3 \cdot C_{12}O_9 \cdot 18H_2O$$

the same is dried at a temperature of from about 100° F. to about 210° F., and for a period of time necessary to prevent the sudden evolution of excessive water therefrom. The dried product, still containing $$Al_2O_3 \cdot C_{12}O_9 \cdot 18H_2O$$

is then subjected to calcination in a free oxygen-containing atmosphere, such as air, at a temperature within the range of from about 600° F. to about 1400° F., and for a period of from about 1 to about 12 hours. The calcination procedure is such that anhydrous alumina is produced; that is, such that the ratio of water to alumina is less than about 3 to 1 on a mol basis. The catalytically active metallic components are then combined with the calcined alumina in any suitable manner and in any desired concentration.

As hereinabove set forth, the alumina, prepared in accordance with the method of the present invention, is especially advantageous for utilization in those processes encompassing reactions promoted by at least one metallic component selected from the metals of Groups VI–A and VIII of the Periodic Table. The term, "metallic component," is employed to designate those components of the catalyst employed for their catalytic activity, thereby distinguishing the same from the material employed as the carrier therefor. Thus, the term includes at least one component selected from the group of molybdenum, tungsten, chromium, iron, cobalt, nickel, platinum, palladium, iridium, osmium, rhodium, ruthenium, etc. The term is also employed to include compounds of the foregoing metals, whether existing as oxides, sulfides, sulfates, etc., within the final catalytic composite. Although the catalytically active metallic components may be combined with the calcined carrier material in any suitable manner, an impregnating technique, involving the utilization of water-soluble compounds of the foregoing metals, is particularly preferred. Water-soluble compounds which may be employed in the impregnating solution include, but not by way of limitation, ammonium molybdate, cobalt nitrate hexahydrate, nickel nitrate hexahydrate, molybdic acid, chloroplatinic acid, chloropalladic acid, dinitrito diammino platinum, etc. In those instances where the metallic compound is not water-soluble, solvents such as alcohols, ethers, etc. may be employed. The calcined carrier material, preferably containing alumina, either as the sole component of the carrier or in combination with one or more other refractory inorganic oxides, and the impregnating solution are intimately admixed, dried at a temperature of from about 100° F. to about 200° F. to remove the excessive water contained within the impregnating solutions, and thereafter calcined, in an atmosphere of air, at a temperature of from about 600° F. to about 1400° F. In some cases, it may be desirable to perform the high temperature treatment in an atmosphere of inert gas such as nitrogen, argon, etc. Following the calcination of the impregnated alumina-containing carrier material, the composite may be treated in any desired manner which results in the conversion of the catalytically active metallic components to a particularly desired combined form. Thus, the calcined material may be subjected to a reducing treatment, in an atmosphere of hydrogen; it may be treated with hydrogen sulfide, or a mixture of hydrogen and hydrogen sulfide, to convert at least a part of the active metallic component to the sulfide thereof, etc.

Where it is desired to incorporate other refractory inorganic oxides with the alumina, the same may be accomplished either before or after the formation of the reaction product of aluminum hydroxide with mellitic acid. Such other refractory inorganic oxides include silica, zirconia, thoria, boron oxide, titania, hafnia, strontia, etc., and mixtures of two or more. Similarly, where it is desired that the final catalytic composite comprises halogen, generally in an amount within the range of from about 0.1% to about 8.0% by weight, the same may be incorporated either before or after the formation of the reaction product containing $Al_2O_3 \cdot C_{12}O_9 \cdot 18H_2O$.

The preferred method of preparing a catalytic composite, comprising at least one metallic component from the metals of Groups VI–A and VIII of the Periodic Table, for example an alumina-platinum composite, is effected by initially forming a hydrosol from a suitable aluminum salt. Aluminum chloride is generally preferred as the aluminum salt due to the subsequent convenience in filtering and washing the reaction product formed by the addition of the mellitic acid. Thus, to an aluminum chloride hydrosol, containing about 12.0% by weight of aluminum and about 10.7% by weight of chloride, mellitic acid is added in an amount to result in an ultimate reaction product having a mol ratio of $Al_2O_3$ to $C_{12}O_9$ of about 2 to 1. The mellitic acid is soluble in water, alcohol, etc. and any such solution may be employed. Ammonium hydroxide, or other suitable alkaline precipitant, is added to the mixture of mellitic acid and aluminum chloride hydrosol in an amount to precipitate the desired quantity of reaction product therefrom. The precipitate, containing $Al_2O_3 \cdot C_{12}O_9 \cdot 18H_2O$, exists in a wet state, and is dried at a temperature of about 200° F. to remove excessive water therefrom. The thus dried product is subjected to calcination at a temperature of 1200° F., and for a period of time necessary to reduce the mol ratio of water to aluminum to less than about 3 to 1. The calcined product is then impregnated with a chloroplatinic acid solution containing that quantity of platinum which will result in the desired final catalytic composite. The drying of the impregnated composite is effected at a temperature within the range of about 200° F., and the subsequent calcination at a temperature within the range of about 1200° F.

The catalytically active metallic components will generally be present within the final catalytic composite in quantities substantially less than the carrier material. For example, the platinum-group metals from Group VIII of the Periodic Table are generally present within the range of about 0.01% to about 5.0% by weight, whereas iron-group metals are generally present in amounts within the range of from about 1.0% to about 10.0% by weight. Depending upon the use to which the catalyst is ultimately intended, the Group VI–A metallic components will be employed in amounts within the range of about 4.0% to about 20.0% by weight.

Regardless of the precise composition of the catalytic composite utilizing the carrier material as hereinabove prepared, and regardless of the precise process in which such catalyst is ultimately employed, the activity and stability of the catalyst is substantially increased as a result of increasing the semi-conducting properties of the catalyst, thus enhancing the flow of electronic charge through the bulk of the support to the surface, permitting local electrical excesses to produce catalytic activity.

In addition to the advantages with respect to enhanced electronic conductivity, a quite different effect is produced which is advantageous in many reactions. During the calcination step, some or all of the mellitic acid is removed by vaporization or decomposition. The removal of large fragments or entire molecular forms large pores, and the resulting composite is higher in porosity and has a lower apparent bulk density than is normally produced. For many reactions, especially those in which the product can react further in the presence of the catalyst to form undesired by-products, the more open structure permits more rapid diffusion of the desired product from the pores and hence enhances the selectivity.

I claim as my invention:

1. A method of preparing alumina which comprises reacting mellitic acid with aluminum hydroxide, drying the resulting reaction product at a temperature of from about 100° F. to about 210° F. and calcining the dried product at a temperature of from about 600° F. to about 1400° F. in an atmosphere containing free oxygen to form substantially anhydrous alumina.

2. A method of preparing alumina which comprises forming an aluminum-containing hydrosol, commingling mellitic acid with said hydrosol, precipitating alumina therefrom, drying the resulting precipitate at a temperature of from about 100° F. to about 210° F. and calcining the dried precipitate at a temperature of from about 600° F. to about 1400° F. in an atmosphere containing free oxygen to form substantially anhydrous alumina.

3. A method of preparing alumina which comprises precipitating aluminum hydroxide from an aluminum-containing hydrosol, reacting mellitic acid with said aluminum hydroxide, drying the resulting reaction product at a temperature of from about 100° F. to about 210° F. and calcining the dried product at a temperature of from about 600° F. to about 1400° F. in an atmosphere containing free oxygen to form substantially anhydrous alumina.

4. A method of preparing alumina which comprises reacting mellitic acid with aluminum hydroxide to form a reaction product containing $Al_2O_3 \cdot C_{12}O_9 \cdot 18H_2O$ and having an $Al_2O_3$ to $C_{12}O_9$ mol ratio not substantially greater than 3 to 1, drying said reaction product at a temperature of from about 100° F. to about 210° F. and calcining the dried product at a temperature of from about 600° F. to about 1400° F. in an atmosphere containing free oxygen to form substantially anhydrous alumina.

5. The method of claim 4 further characterized in that said dried product is calcined to form anhydrous alumina containing less than about 3 mols of water per mol of alumina.

References Cited by the Examiner

UNITED STATES PATENTS

| | | | |
|---|---|---|---|
| 485,461 | 11/1892 | Dewey | 23—141 |
| 2,275,211 | 3/1942 | Urbain et al. | 260—448 X |
| 2,746,842 | 5/1956 | Block et al. | 23—143 |
| 2,801,901 | 8/1957 | Dingman et al. | 23—142 |
| 2,810,182 | 10/1957 | Brandes. | |
| 2,818,393 | 12/1957 | Lefrancois et al. | 252—466 |
| 2,907,634 | 10/1959 | Ziese et al. | 23—143 |
| 2,920,053 | 1/1960 | Webb | 252—466 |

MAURICE A. BRINDISI, *Primary Examiner.*